(12) United States Patent
Gasquet

(10) Patent No.: US 7,452,114 B2
(45) Date of Patent: Nov. 18, 2008

(54) SIGNALLING OR LIGHTING APPARATUS, IN PARTICULAR FOR A MOTOR VEHICLE

(75) Inventor: Jean-Claude Gasquet, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 11/013,272

(22) Filed: Dec. 15, 2004

(65) Prior Publication Data
US 2005/0141213 A1    Jun. 30, 2005

(30) Foreign Application Priority Data
Dec. 19, 2003    (FR)    ................................... 03 15115

(51) Int. Cl.
*F21V 13/00*    (2006.01)
(52) U.S. Cl. ........................ 362/511; 362/551; 362/555; 362/615
(58) Field of Classification Search .................. 362/26, 362/29, 30, 615–629, 511, 509, 520, 551, 362/555, 326–327, 333–338, 341–350; 200/310, 200/312–314, 317; 340/463, 465, 468–469, 340/475
See application file for complete search history.

(56) References Cited

U.S. PATENT DOCUMENTS

| | | | | |
|---|---|---|---|---|
| 3,532,871 | A * | 10/1970 | Shipman | 362/506 |
| 4,737,896 | A * | 4/1988 | Mochizuki et al. | 362/301 |
| 4,862,330 | A * | 8/1989 | Machida et al. | 362/522 |
| 4,947,293 | A | 8/1990 | Johnson et al. | |
| 6,097,549 | A * | 8/2000 | Jenkins et al. | 359/726 |
| 6,193,383 | B1 * | 2/2001 | Onikiri et al. | 362/26 |
| 6,565,244 | B1 | 5/2003 | Murphy et al. | |
| 6,724,543 | B1 * | 4/2004 | Chinniah et al. | 359/718 |
| 6,755,556 | B2 * | 6/2004 | Gasquet et al. | 362/329 |
| 6,953,271 | B2 * | 10/2005 | Aynie et al. | 362/511 |
| 2003/0026106 | A1 | 2/2003 | Knaack et al. | |

FOREIGN PATENT DOCUMENTS

| | | |
|---|---|---|
| DE | 198 57 561 A1 | 6/2000 |
| EP | 0 515 921 A | 12/1992 |
| WO | 82/00272 | 2/1982 |
| WO | 99/09349 | 2/1999 |

OTHER PUBLICATIONS

Motorola Optoelectronics Device Data, Semi Conductor Technical Data, 1989, pp. (4-11)- (4-12).*
French Patent Office; "French Search Report"; corresponding to FR Patent Application No. FR 03 15 115; dated May 24, 2004; (3 pages).

* cited by examiner

*Primary Examiner*—John A. Ward
*Assistant Examiner*—Robert May
(74) *Attorney, Agent, or Firm*—Morgan & Finnegan, LLP

(57) ABSTRACT

A signalling or lighting apparatus comprising at least one light source defining a main emission direction, together with at least one elongate light guide, one end of which is lit by the light source, the light guide being adapted to diffuse the light transversely along its length. At least in the vicinity of the light source, the guide has a longitudinal axis which is disposed transversely to the main emission direction, in such a way that some of the light flux from the light source provides a primary signalling or lighting function with a relatively high luminous intensity, and a second signalling or linear lighting function, of lesser light intensity, is provided along a length of the light guide.

14 Claims, 4 Drawing Sheets

SIGNALLING OR LIGHTING APPARATUS, IN PARTICULAR FOR A MOTOR VEHICLE

FIELD OF THE INVENTION

This invention relates to a signalling or lighting apparatus, in particular for a motor vehicle, of the kind comprising at least one light source defining a main direction of emission and at least one elongate light guide, one end of which is lit by the light source, the said guide being adapted to diffuse the light transversely with respect to its lengthwise direction.

BACKGROUND OF THE INVENTION

The document EP-A-0 515 921 discloses an apparatus of this type which is arranged to provide illumination of the interior of a vehicle, and which is incorporated within a door handle. The light intensity in a direction at right angles to the lengthwise direction of the light guide does not have any preferential zone, and remains relatively weak.

Now, it is desirable that signalling or lighting apparatus, generally oriented towards the outside of a vehicle, shall enable the attention of other motorists or pedestrians to be strongly attracted.

OBJECTS OF THE INVENTION

Accordingly, the main object of the invention is to provide a signalling or lighting apparatus of the kind defined above, which enables the light emitted by the light source to be made better use of, and to provide at least one zone with a high luminous intensity combined with at least zone of the light guide which illuminates with a lesser intensity.

Another object of the invention is to provide a signalling or lighting apparatus which, while being simple and robust, enables the zones of a vehicle to be well lit.

DISCUSSION OF THE INVENTION

According to the invention, a signalling or lighting apparatus of the kind defined above is characterised in that the light guide, at least in the vicinity of the light source, has a longitudinal axis disposed transversely to the main direction of emission, so that a part of the light flux from the source provides, independently of the light guide, a first signalling or lighting function with a relatively high light intensity, and so that a linear second signalling or lighting function, of lesser light intensity, is provided along the length of the light guide.

In general, the light source may also emit in oblique directions, and the light source provides the first signalling or lighting function in the main emission direction, while the linear second signalling or lighting function is provided along the length of the light guide by the emission in the oblique directions.

Preferably, the apparatus includes an optical system associated with the light source for the purpose of concentrating the emission in the main direction. The first signalling or lighting function, provided directly by the light source, is thereby reinforced.

Preferably, the light source comprises at least one light emitting diode which illuminates substantially over a hemisphere, and the light guide, at least in the vicinity of the light source, has its longitudinal axis at right angles to the main emission direction.

A plurality of light guides may be associated with a common light source, being spaced apart circumferentially around the main emission direction.

The light guides may be straight or curved.

The light source may be located in a central position between at least two light guides, which are, in particular, symmetrical with respect to the light source, and which are preferably aligned with each other.

The optical system associated with the light source for concentrating emission comprises a supplementary lens of transparent material, which has facets oriented at appropriate angles in order to provide internal reflections of the light before it is emitted, and in order to perform a target function. Such an optical system is also called a "light motor".

The apparatus may include a plurality of light sources which are joined together by light guides adapted for transverse diffusion.

A light guide may include at least one neutral zone from which transverse diffusion of the light is absent.

The apparatus may include a convergent lens so oriented as to form the main beam.

A convergent lens may be arranged at the end of each light guide close to the light source for the purpose of collimating the light rays in the guide.

The wave guides situated on either side of the source may constitute a single component which includes a housing for the light source, those faces of the housing that correspond to the ends of the wave guides being convex whereby to concentrate the light rays in the guides.

Diffusion of the light by the light guide is obtained through a face which is situated to the rear with respect to the emission. This face includes ribs or optical micro-motifs, and is preferably metallised in order to improve its light transmission.

The width of the diffusing strip may be predetermined in order to widen the field of apparent luminance, by an angle of ±10° for example.

In a modified version, the light source comprises a plurality of elementary light sources which are split into at least two sub-assemblies, one of the two said sub-assemblies being associated with an optical system for the purpose of ensuring the main signalling or lighting function, while a further sub-assembly co-operates with at least one light guide for the purpose of ensuring a secondary function over a large length.

Within the definitions set forth above, the invention comprises a number of other arrangements, which will be explained more fully below, with reference to the embodiments described by way of example and with reference to the attached drawings, though these are in no way limiting.

DESCRIPTION OF PREFERRED EMBODIMENTS OF THE INVENTION

With reference to FIGS. 1 to 6 of the drawings, these show a signalling apparatus S for a motor vehicle which is arranged to perform the "raised stop light" function, which is also called the CHMLS (central high mounted lamp stop) function. The signalling or lighting apparatus according to the invention is of course not limited to this type of function.

The apparatus includes a light source L which consists of a light emitting diode 1 which is arranged to emit light upwards (with reference to FIG. 1), in a main direction X-X and in directions B which are oblique with respect to the main direction X-X.

Figure 3:
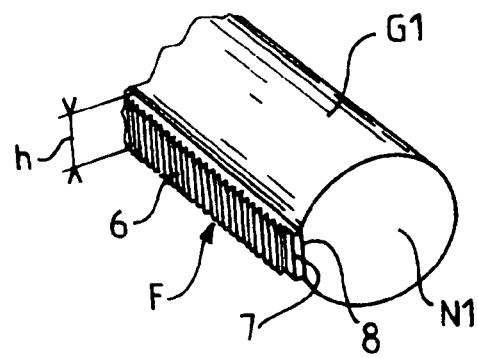
FIG. 3 is a perspective view on a larger scale, seen from behind and showing part of one end of the light guide.
Figure 4:
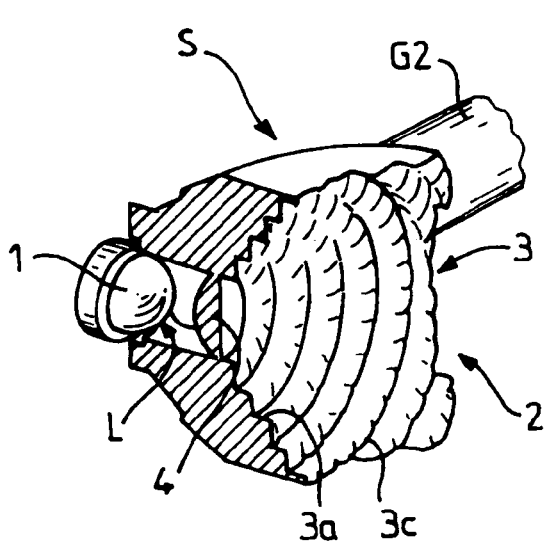
FIG. 4 is a cut-away perspective view seen from the front, showing the light source with a supplementary optical lens for concentrating the light, together with the beginning of the light guide.
Figure 5:
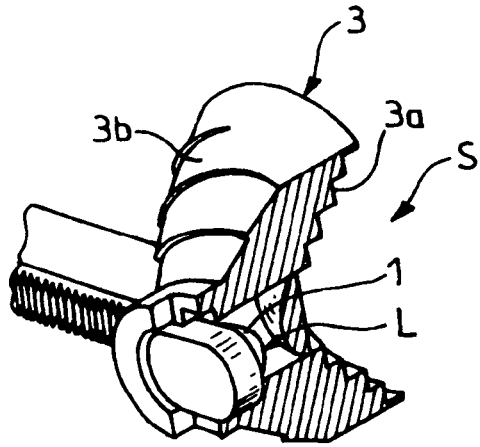
FIG. 5 is a perspective view from the rear with respect to FIG. 4.

A light guide G1, of elongate form, is disposed with its longitudinal axis Y1 oriented transversely, at least in the vicinity of the diode 1. Preferably, the axis Y1 is orthogonal to the main direction X-X of emission. The light guide G1 may consist of a fibre optic, which may for example be cylindrical and with a right circular cross section, as shown in FIG. 3. The right cross section could be different from a circle. The end face E1 of the guide G1 close to the source L is at right angles to the axis Y1.

A direction B is considered as being oblique when it is inclined with respect to the direction X-X by a sufficiently large angle to enter into the guide G1 through the face E1. This angle may be of the order of 30°.

The outer surface of the emitting zone of the diode 1 is substantially hemispherical. The face E1 is tangential to the surface 1*a*, parallel to the direction X-X. The guide G1 extends, on the side opposite to the diode 1, over a relatively large length, which is in particular more than 500 millimetres, the diameter of the guide G1 being of the order of 8 millimetres.

A second light guide G2 is preferably provided in alignment with the light guide G1 and symmetrically with respect to the axis X-X. The longitudinal axis Y2 of the guide G2 is aligned with the axis Y1.

Figure 1:
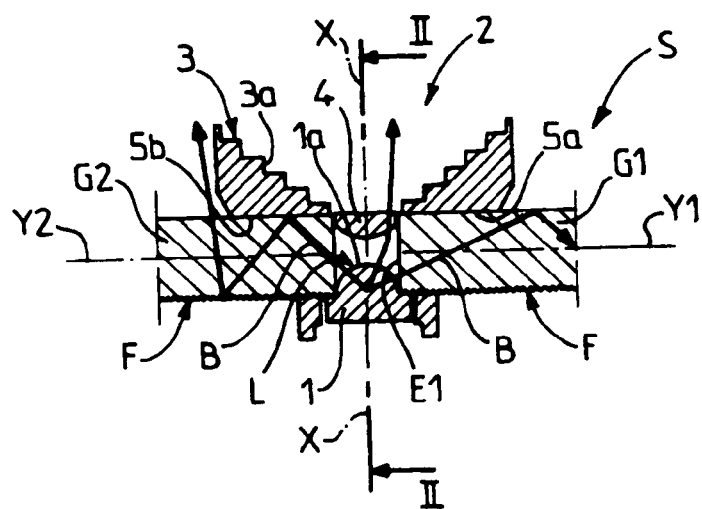
FIG. 1 shows part of an apparatus in accordance with the invention, in cross section through a plane which passes through the longitudinal axis of the light guides situated on either side of the light source.
Figure 2:
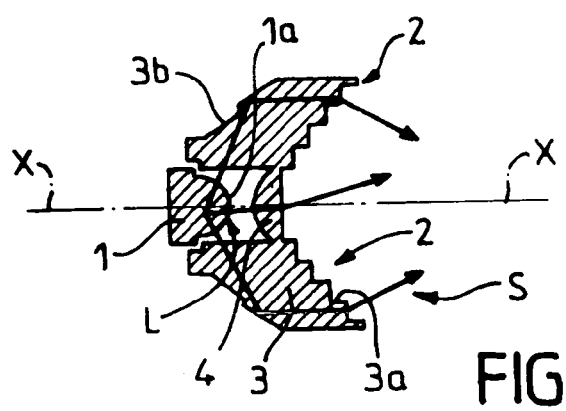
FIG. 2 is a cross section taken on the line II-II in FIG. 1.

An optical system 2 is associated with the light source L for the purpose of concentrating the emission of light in the direction X-X. The optical system 2 comprises a supplementary lens 3 of transparent material, which is for example a plastics material. The supplementary lens 3 is in the form of a bowl, the concavity of which faces away from the diode 1. The transverse cross section of the concave surface of the supplementary lens is defined by right angled steps 3*a* which are arranged to ensure that light rays are concentrated as illustrated in FIG. 2, along the axis X-X. The rear surface 3*b* of the supplementary lens is substantially frusto-conical, and is inclined at an angle which is favourable to internal reflections. Tile elements 3*c*, in the form of lenses (see FIG. 4) may be provided on the annular zones of the steps 3*a* situated in the planes at right angles to the direction X-X. The tile elements 3*c* have a surface which is convex forward, and are arranged to boost the concentration of the light rays. The central portion of the concave zone of the supplementary lens constitutes a semi-convex lens element 4, the convex face of which is directed towards the light emitting diode 1.

The supplementary lens 3 includes two diametrically opposed cylindrical housings 5*a* and 5*b*, having an axis at right angles to the direction X-X and arranged to receive the ends of the light guides G1 and G2 which are accurately positioned therein.

The surface F of the light guides G1 and G2 situated opposite to the exit for light in the direction X-X is modified in such a way as to send the light transversely to the axes Y1 and Y2 of the light guides, on the same side as the main light emission in the direction X-X.

The modified surface F may include ribs or sawtooth elements 6, which constitute Fresnel prisms with a triangular cross section having its edge at right angles to the axes Y1 and Y2 and to the direction X-X. The prisms thus formed can constitute the rear face of a strip 7 (FIG. 3) incorporated in the tubular light guides G1 and G2 during manufacture, which is carried out by injection moulding of transparent plastics material in a mould.

The flat face 8 is arranged to extend in a direction parallel to the axis Y1, Y2, while remaining orthogonal to the direction X-X.

The surface F, and in particular the oblique surfaces of the sawtooth elements 6, may be metallised.

The sawtooth elements 6 could be replaced by optical micro-motifs (in the form of holes of suitable profile formed in the material), in order to improve the homogeneous appearance of the light guide. These optical micro-motifs are in particular obtained either directly by laser machining of the rear datum face 8 of the light guide G1, G2, or else through motifs which are formed in the mould during the injection process. In that case, the sawtooth elements 6 and/or the strips 7 would not be used.

The width h (FIG. 3) of the diffuser strip, that is to say the dimension of the surface F in the direction orthogonal to the plane passing through the axis of the light guide and the direction X-X, is so calculated as to widen the apparent field of luminance seen by an observer. For a light guide G1, G2 which is horizontal, the luminance field angle is preferably ±10° with respect to the horizontal plane.

In the case where the system is used in a substantially vertical direction, this luminance field angle is chosen to be greater, in order to increase the zone of visibility in a horizontal plane.

Figure 7:
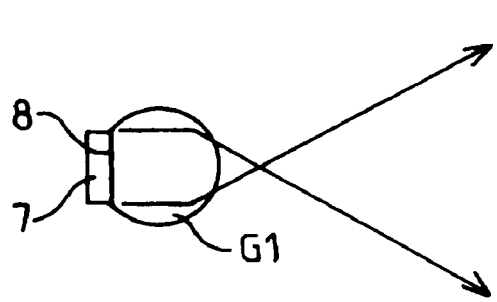
FIG. 7 is a view in transverse cross section showing the light guide, with the path of light rays being shown.

As is shown in FIG. 7, the cylindrical form of the light guide G1 with a circular transverse cross section enables the diffusion zone to be increased by a conventional magnifying effect.

The signalling apparatus operates in the following way.

When the light emitting diode 1 is lit, a main emission takes place in the direction X-X. The luminous intensity is concentrated by the lens 4 and by the optical device consisting of the supplementary lens 3.

This signalling function is concentrated with a relatively high luminous intensity.

A very long, and homogeneous, second signalling function is obtained on either side of the supplementary lens 3, following the length of the light guides G1 and G2, from the oblique rays such as the rays B, which are reflected internally within the light guides so as to be emitted forwards through the surface F, that is to say on the same side as the main emission.

The signalling apparatus of the invention can thus be broken down into two complementary sub-assemblies, as follows:

a central part corresponding to the diode 1 and supplementary lens 3; the purpose of this part is to perform the main function, which in the example being considered here is the "raised stop light" function; the function makes use of the internal reflection properties of the material of the supplementary lens 3, while the form of the central part can be adapted, in accordance with requirements of styling and relative performance, in order to satisfy the above mentioned function; and two appendices consisting of the light guides G1 and G2, which enable a homogeneous lighting function over a very great length to be achieved, generating a fluid style to emphasise the lines of a vehicle.

It is of course possible to achieve a symmetrical linear function with respect to the supplementary lens 3, which enables it to be adapted to conventional signalling functions over a very large length whereby to emphasise a vehicle contour, in particular of the "break" kind. In this connection, it is difficult, with conventional optical means, to install a luminous signalling system in any zones which are somewhat inaccessible.

Figure 6:
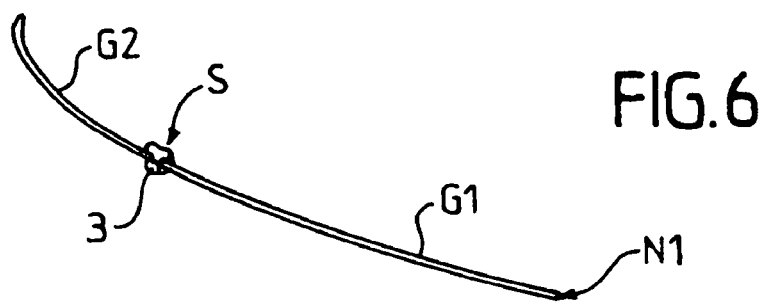
FIG. 6 is an assembly view of light guides and a central optical system such as is described above, on a reduced scale.

FIG. 6 shows the optical system with the two very long light guides G1 and G2 extending on either side of the supplementary lens 3.

For example, the light guides enable the curve of the rear window to be followed, or enable a part of the bodywork or outline of the vehicle to be followed.

In the present example, two diametrically opposed light guides are arranged on either side of the light emitting diode 1. More than two guides could be provided, for example four guides in a common plane, with the light outputs of the guides being offset angularly by 90°.

The total length of the light guides may exceed 1300 millimetres. The form of the light guide can be adapted according to the style of the supporting vehicle. The central component consisting of the supplementary lens 3 may be round or rectangular, with a large dimension which is of the order of 20 to 30 millimetres according to requirements.

Figure 14:
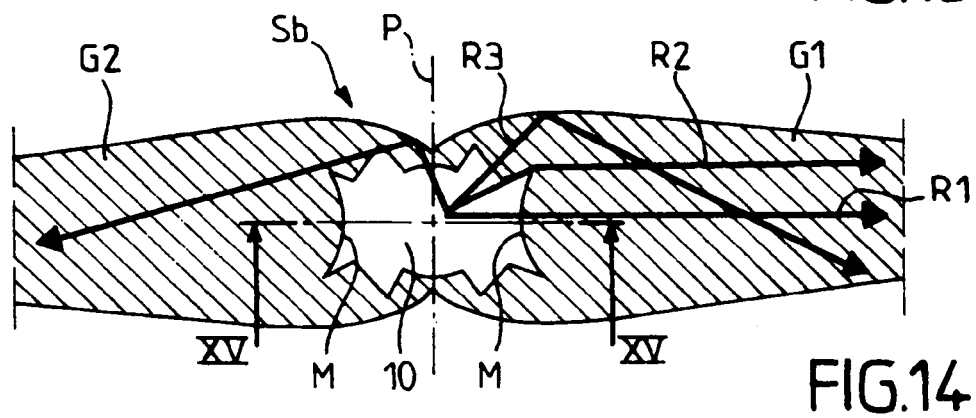
FIG. 14 is a partial longitudinal cross section of a component which constitutes two light guides on either side of a housing which is adapted to receive the light source.

As shown in FIG. 14, it is of advantage to provide a convergent lens M on the input face of the light guide in order to collimate, that is to say to make essentially parallel, the light beam within the light guide, and thereby to increase the amount of light passed towards the end N1 (FIGS. 3 and 6) of the light guide which is remote from the light emitting diode 1.

This end N1 (FIG. 3) preferably consists of a flat plane at right angles to the longitudinal axis of the light guide, this face being metallised in order to transmit light to the interior of the light guide G1 or G2. The light output of the system is thereby improved.

Numerous arrangements may be adopted in order to achieve the signalling function.

Figure 8:
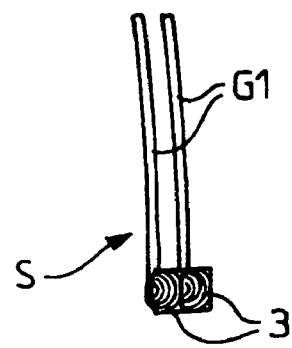
FIG. 8 to FIG. 11 show some possible modified embodiments, with straight or curved light guides.

FIG. 8 shows an asymmetric arrangement with two supplementary lenses 3 and two corresponding light sources which are juxtaposed, with a single light guide G1 being associated with each supplementary lens. The two light guides G1 are parallel, substantially vertical, and straight, and are disposed on the same side of the supplementary lenses 3.

Figure 9:
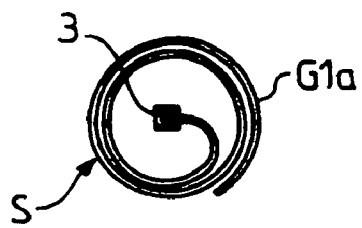

FIG. 9 shows an arrangement with a supplementary lens 3 and a light source at the centre of a light guide G1a, which extends from the said supplementary lens and which is formed substantially as a circular spiral with two turns situated in a common plane.

Figure 10:
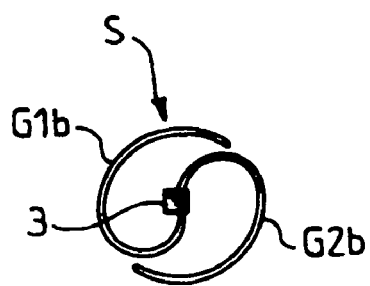

FIG. 10 shows a signalling apparatus which includes at its centre the supplementary lens 3 with the light source. Two diametrically opposed light guides G1b and G2b extend from the said supplementary lens and are curved substantially in a half turn in opposite directions and in a common plane, so that the motif as a whole is S-shaped.

In a modified version, the curves defined by the light guides may be crooked curves which are not situated in one plane.

Figure 11:
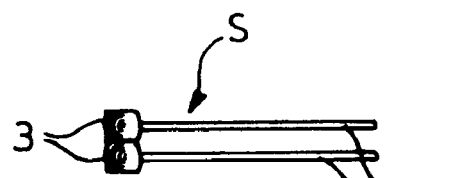

FIG. 11 shows a modified version of FIG. 8, with the two parallel light guides G1 being horizontal and situated on the same side of the supplementary lenses.

Numerous functions may be obtained, including in particular those of: stop lights; parking lights; direction indicators; reversing lights; and others. The colour of the light emitting diode 1 will be chosen accordingly.

It is also possible to create various designs which still consist of a central optical system with a light source, in particular the light emitting diode 1, together with at least one complementary light guide, thereby enabling styling possibilities to be increased.

It is possible to combine these components in order to obtain adaptable styles. The symmetrical versions are obtained by arranging a main light source at the centre of the system or at each of its ends. The symmetrical versions may be isolated or grouped together in groups of several units (that is to say two or more assemblies as illustrated in FIGS. 8 and 11), in order to increase the optical performance and with a view to being able to obtain the functions which make best use of the light flux.

The versions may be linear (as in FIGS. 8 and 11) or circular (as in FIG. 9), or they may be curved (as in FIG. 10) to a greater or lesser extent, which enables the apparatus to be adapted to the requirements of style or form.

Figure 12:
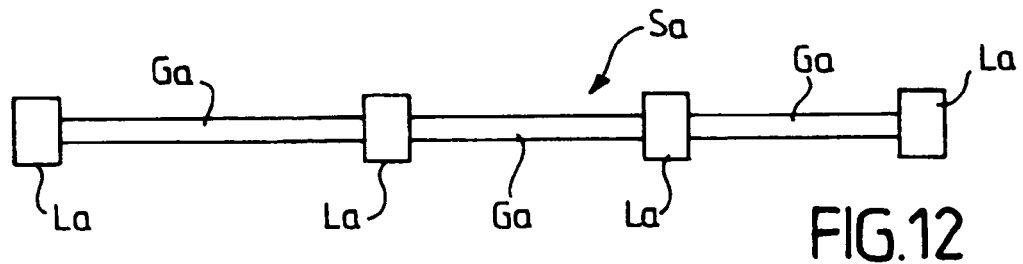
FIG. 12 shows an apparatus with three aligned light guides, two light sources between two guides, and two further light sources at the ends.

FIG. 12 shows a linear signalling apparatus Sa which makes use of four main light sources La of medium power, spaced apart and connected together by diffusing light guides Ga. The distances between the sources La may be different.

Other arrangements are of course possible, with a different number of light sources La, and in particular with only two sources, one at each end of the light guide.

Figure 13:
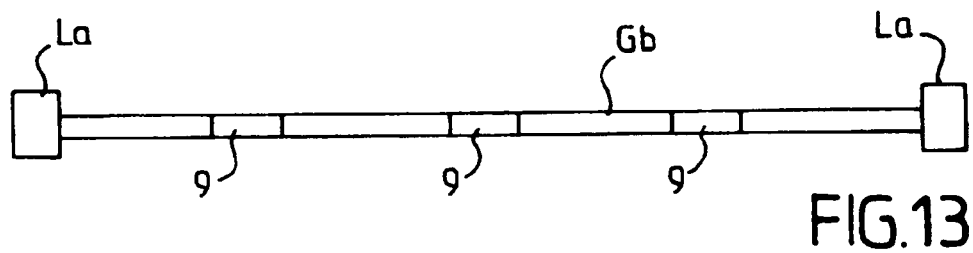
FIG. 13 shows an apparatus with a light guide having a light source at each end and including neutral zones which are not lit.

In FIG. 13, the signalling apparatus has only two light sources La, one at each end of the light guide Gb. The light guide Gb has spaced-apart neutral zones 9, in which the diffusion of light towards the outside has been suppressed, so that these zones 9 would appear to be unlit. It is thus possible to obtain a signalling apparatus of the "pointillist" type, by contrast with a continuous line of light.

FIG. 14 shows a monobloc arrangement of the signalling apparatus Fb, in which the two opposed light guides G1 and G2 constitute a single component, the junction zone of which defines a plane of symmetry P at right angles to the longitudinal axis of the light guides. The cross section of the contour of the junction zone through the plane of FIG. 14 is in the form of a V with a wide opening, the branches of which are convex outwards. These branches then curve inwards to join the cylindrical portion of the light guide which has a smaller diameter than the junction zone.

A housing 10 is provided for the light emitting diode 1 in the junction zone. This housing 10 is open towards the rear in an aperture 10a (FIG. 15), through which the light emitting diode 1 can be inserted. The internal surface of this housing has zones such as a zone 11 (see FIG. 16), which enable the diode 1 to be held and centred in the housing by hugging the contour of the diode.

The input faces for light in the light guides G1 and G2 consist of the convex lenses M for collimating the light beam in each light guide, as is indicated diagrammatically with two rays R1 and R2 which are divergent within the housing 10 before they fall on the convex face of the lens M, and which become substantially parallel within the light guide.

A ray such as the ray R3 enters into the light guide beyond the contour of the lens M, undergoes internal reflection within the light guide, and is then transmitted forwards.

The housing 10 is closed at the front by a semi-convex lens 12, the convex surface 13 of which faces towards the interior of the housing 9 and has a flat face 14 facing outwards. The hemispherical portion of the light emitting diode 1 is close at its pole to the pole of the face 13. The light guides G1 and G2 are formed with oblique facets 15 (see FIG. 18) on either side of the flat face 14 of the lens, and formed in planes which are inclined to the direction X-X and at right angles to the plane of FIG. 15.

Figure 16:
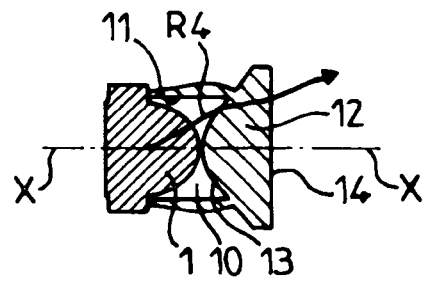
FIG. 16 is a cross section taken on the line XVI-XVI in FIG. 15.

FIG. 16 shows the path of a light ray R4 produced by the light emitting diode 1 which, after having passed through the lens 14, is somewhat inclined with respect to the direction X-X.

Figure 15:
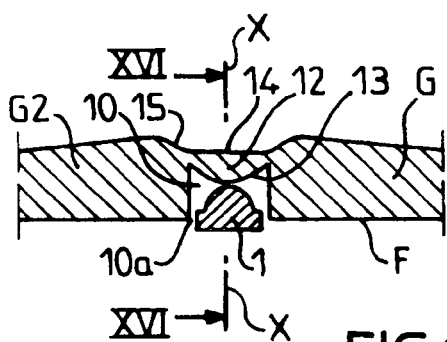
FIG. 15 is a cross section taken on the line XV-XV in FIG. 14, but on a smaller scale and with the light source.

In the arrangement of FIGS. 15 and 16, the lens 12 is integrated, that is to say it is formed as one piece with the light guides G1 and G2.

Figure 17:
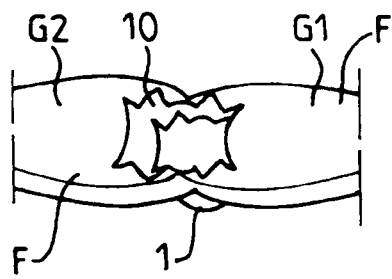
FIG. 17 is a perspective view seen from behind, showing a modified version of FIG. 14 with a light source introduced into the housing.
Figure 18:
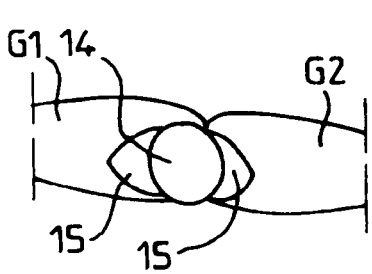
FIG. 18 is a perspective view, from the front with respect to FIG. 17.

In the modified version of FIGS. 17 and 18, the housing 10 is open towards the front, and an independent lens 12 is fixed in the front aperture of the housing 10.

The collimated part of the beam, formed by rays such as the rays R1 and R2, enables the luminance of the beam to be increased at the end of the light guide further from the light emitting diode 1.

In the version of FIGS. 14 to 18, the signalling system is more compact, especially in its central zone. The internal and external form of the light guides, in the junction zone, is designed in such a way as to optimise the distribution of light flux between the visible face 14 of the central lens and the lateral light guides G1 and G2. In this way it is possible to adjust the relative luminance of the various zones in this signalling function.

The homogeneous appearance of the light guides is improved by the light which is collimated by the lenses M.

This design may be made in a monobloc form as shown in FIGS. 14 to 18, or by putting together sub-assemblies which enable the moulds used for injection moulding to be simplified.

The light guides may take three dimensional forms, for example in order to follow crooked surfaces which are characteristic of the interior cabin.

It is possible to obtain the parking light function in the motor vehicle headlight with free forms.

It is also possible to envisage a profile which is rectangular, or modified from the circular form towards a rectangle, by adapting the rear part in order to ensure a continuously homogeneous illuminated appearance, by the use of micro-ribs or micro-optics.

The invention enables good signalling functions to be obtained with a reduced number of light emitting diodes. The apparatus is very flexible in its ability to be adapted, thus enabling it to perform various functions, such as signalling or internal lighting, using white light emitting diodes.

The proposed apparatus enables styling effects to be obtained in order to provide a signature for a vehicle, by making use of the possibilities offered by a cold light emitted by the light emitting diodes, together with the properties of transparent plastics materials for conducting light over large distances.

Known manufacturing methods can be used to make the apparatus, for example injection of components and treatment of surfaces by deposition of a metallised film by hot deposition or by surface machining, or by laser treatment.

The perceived quality of the light emitted is brighter than that obtained with a neon tube, because the light emitting diodes emit monochromatic light which is unmodified by the light guide.

Figure 19:
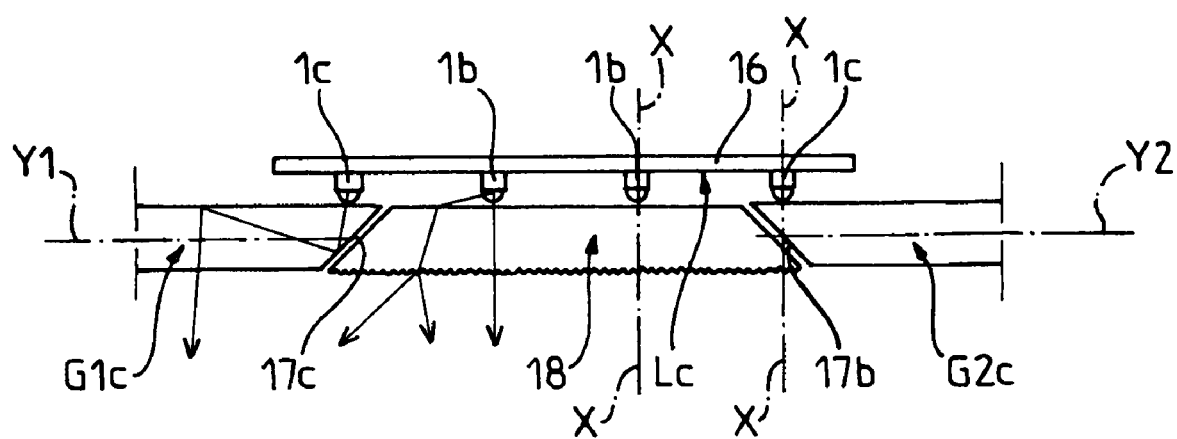
FIG. 19 is a diagram relating to a modified embodiment with a light source which comprises a plurality of light emitting diodes.

A modified version of the apparatuses described above consists in making use, as illustrated in FIG. 19, of a light source Lc which consists of several elementary light sources in the form of light emitting diodes, 1b, 1c or specialised kinds. These diodes are fixed on a support 16 in such a way that their main directions of emission X-X are parallel to each other.

One or more light emitting diodes 1c, constituting secondary lateral light sources, pass light into an associated one of a plurality of tubular light guides G1c, G2c, in order to increase the illuminated surface area of the particular function concerned. The end face 17b or 17c of the light guide is inclined, for example by 45°, to the axis of the light guide. The light emitted by the light emitting diodes 1c in the main direction is transmitted through the face 17b or 17c in the corresponding light guide. Preferably, one light emitting diode is provided for each tubular light guide.

One or more light emitting diodes 1b are used to obtain the main function. They are associated with one or more optical systems 18 which are specific to the signalling function which is to be obtained (that is to say CHMLS, stop or parking light, or direction indicating for example). A main function optical system 18 can be made in the form of a lens which distributes the light in a manner which is more or less identical to the supplementary lens 3 described above, or through a system with a specific reflector according to the required final style. The optical system 18 preferably occupies a central position, while the light guides G1, G2 are located laterally.

What is claimed is:

1. A signalling or lighting apparatus for a motor vehicle, comprising:
   (a) at least one light source which emits a light flux having a main direction of light emission;
   (b) an optical system comprising a supplementary lens of transparent material and having facets oriented at appropriate angles to provide internal reflections of the light before it is emitted for concentrating a part of the light flux emission in the main direction; and
   (c) at least one light guide comprising an elongate body having a first end face, a second end face and a peripheral side surface extending between the first end face and the second end face, the first end face disposed adjacent the light source and transverse to the main direction of the light flux, wherein a part of the light flux emitted from the light source provides, independently of the light guide, a first signalling or lighting function with a first light intensity, and another part of the light flux emitted from the light source enters through the first end face of the light guide and is emitted through the peripheral side surface of the light guide to provide a second signalling or lighting function having a second light intensity that is less than the first light intensity.

2. The apparatus according to claim 1, wherein the light flux is emitted from the light source in the main direction and directions oblique to the main direction and light flux in the main direction provides the first signalling or lighting function and light flux in an oblique direction provides the second signalling or lighting function.

3. The apparatus according to claim 1, wherein the light source comprises at least one light emitting diode which illuminates substantially over a hemisphere, and the light guide, at least in the vicinity of the light source, has a longitudinal axis at right angles to the main emission direction.

4. The apparatus according to claim 1, wherein a plurality of light guides are associated with a common light source, the plurality of light guides being spaced apart circumferentially around the main emission direction of the light flux.

5. The apparatus according to claim 1, wherein the light guide is curved.

6. The apparatus according to claim 1, wherein the light source is located in a central position between at least two light guides.

7. The apparatus according to claim 1, comprising a plurality of light sources and a separate light guide extending between each adjacent pair of light sources.

8. The apparatus according to claim 1, wherein the light guide comprises at least one neutral zone which does not emit light through the peripheral side surface of the light guide.

9. The apparatus according to claim 1, further comprising a convergent lens oriented to form the first signalling or lighting function in the main direction.

10. The apparatus according to claim 1, wherein a convergent lens is arranged at the first end face of each light guide to collimate the light flux in the light guide.

11. The apparatus according to claim 1, wherein two light guides disposed on either side of the light source constitute a single component which includes a housing for the light source, the housing having faces that correspond to the end faces of the light guides and are convex to concentrate the light flux in the light guides.

12. The apparatus according to claim 1, wherein at least a portion of the light guide peripheral side surface comprises at least one element selected from the group consisting of prisms, strips, and optical micro-motifs.

13. The apparatus according to claim 12, wherein the at least one element selected from the group consisting of prisms, strips or optical micro-motifs is metallised to provide improved light transmission.

14. The apparatus according to claim 1, wherein the light source comprises a plurality of elementary light sources which are split into at least two sub-assemblies, one of the two sub-assemblies being associated with an optical system which provides the main signalling or lighting function, while the other sub-assembly co-operates with at least one light guide to provide a secondary signaling or lighting function emitted through the peripheral side surface of the light guide.

* * * * *